US012681906B2

(12) United States Patent
Rossiello et al.

(10) Patent No.: US 12,681,906 B2
(45) Date of Patent: Jul. 14, 2026

(54) DISCOVERING A SCHEMA FOR A DATA LAKEHOUSE BY IDENTIFYING THE PRIMARY AND FOREIGN KEYS

(71) Applicant: International Business Machines Corporation, Armonk, NY (US)

(72) Inventors: Gaetano Rossiello, Brooklyn, NY (US); Alfio Massimiliano Gliozzo, Brooklyn, NY (US); Daniel Karl I. Weidele, Cambridge, MA (US); Md Faisal Mahbub Chowdhury, Ardsley, NY (US); Oktie Hassanzadeh, Briarcliff Manor, NY (US); Michael Robert Glass, Bayonne, NJ (US); Sugato Bagchi, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 18/658,141

(22) Filed: May 8, 2024

(65) Prior Publication Data

US 2025/0348466 A1     Nov. 13, 2025

(51) Int. Cl.
*G06F 16/21* (2019.01)
*G06F 16/22* (2019.01)
*G06F 16/2455* (2019.01)

(52) U.S. Cl.
CPC ........ *G06F 16/211* (2019.01); *G06F 16/2255* (2019.01); *G06F 16/24558* (2019.01)

(58) Field of Classification Search
CPC ............. G06F 16/211; G06F 16/24558; G06F 16/2255
USPC ......................................................... 707/803
See application file for complete search history.

(56) References Cited

U.S. PATENT DOCUMENTS

| | | | | |
|---|---|---|---|---|
| 10,169,378 | B2 * | 1/2019 | Sassin ................... | G06F 16/211 |
| 11,599,514 | B1 * | 3/2023 | Agrawal ............. | G06F 16/2282 |
| 11,947,509 | B2 * | 4/2024 | Bensberg ............ | G06F 16/2255 |
| 2020/0301895 | A1 * | 9/2020 | Harrison ............. | G06F 16/2423 |
| 2021/0200725 | A1 * | 7/2021 | Suehs ................... | G06F 16/211 |
| 2023/0325418 | A1 | 10/2023 | Dharaskar et al. | |

(Continued)

OTHER PUBLICATIONS

Dimitris Achlioptas, "Database-Friendly Random Projections: Johnson-Lindenstrauss with Binary Coins," Journal of Computer and System Sciences, vol. 66, 2003, pp. 671-687.

(Continued)

*Primary Examiner* — Mohammad Ali
(74) *Attorney, Agent, or Firm* — Scott Dobson

(57) ABSTRACT

Described are techniques for identifying primary and foreign keys to build a schema. A primary key of a query table of a data lakehouse, which may consist of multiple columns, is identified. The top n-similar columns of the tables of the data lakehouse are then identified to identify the joinable tables using the primary key as a query using column embeddings. A list of candidate joinable tables is then identified based on the identified top n-similar columns of tables of the data lakehouse. Joinable tables from the list of candidate joinable tables are selected that satisfy an inclusion dependency constraint. The foreign keys having full containment with the primary key of the query table are then identified from the selected joinable tables. Such identified primary and foreign keys are utilized to build/discover the schema, such as a relational schema, of the data lakehouse.

20 Claims, 8 Drawing Sheets

(56) References Cited

U.S. PATENT DOCUMENTS

| | | |
|---|---|---|
| 2023/0359614 A1 | 11/2023 | Oattes |
| 2024/0095219 A1 | 3/2024 | Joyce et al. |

OTHER PUBLICATIONS

Zhu et al., "LSH Ensemble: Internet-Scale Domain Search," Proceedings of the VLDB Endowment, vol. 9, No. 12, 2016, pp. 1185-1196.

Rossiello et al., "Generative Relation Linking for Question Answering Over Knowledge Bases," arXiv:2108.07337v1, Aug. 16, 2021, pp. 1-12.

Bogatu et al., "Dataset Discovery in Data Lakes," arXiv:2011.10427v1, Nov. 20, 2020, pp. 1-12.

E. F. Codd, "A Relational Model of Data for Large Shared Data Banks," Communications of the ACM, vol. 13, No. 6, Jun. 1970, pp. 377-387.

Dong et al., "Efficient Joinable Table Discovery in Data Lakes: A High-Dimensional Similarity-Based Approach," arXiv:2010.13273v4, Mar. 29, 2021, pp. 1-13.

Eisenschlos et al., "MATE: Multi-view Attention for Table Transformer Efficiency," arXiv:2109.04312v1, Sep. 9, 2021, pp. 1-14.

Halko et al., "Finding Structure with Randomness: Probabilistic Algorithms for Constructing Approximate Matrix Decompositions," arXiv:0909.4061v2, Dec. 14, 2010, pp. 1-74.

Github, "Gaetano-Rossiello/table-vsm," https://github.ibm.com/Gaetano-Rossiello/table-vsm, 2023, pp. 1-4.

Jiang et al., "Holistic Primary Key and Foreign Key Detection," Journal of Intelligent Information Systems, vol. 54, No. 5, Jun. 2020, pp. 1-23.

Johnson et al., "Extensions of Lipschitz Maps into a Hilbert Space," Contemporary Mathematics, vol. 26, 1984, pp. 189-206.

Kaminsky et al., "Discovering Similarity Inclusion Dependencies," Proceedings of the ACM on Management of Data, vol. 1, No. 1, Article 75, May 2023, pp. 1-24.

Glass et al., "Retrieval-Based Transformer for Table Augmentation," arXiv:2306.11843v1, Jun. 20, 2023, pp. 1-12.

Smirnov et al., "Fast Discovery of Inclusion Dependencies with Desbordante," 33rd Conference of Open Innovations Association (FRUCT), Zilina, Slovakia, 2023, pp. 264-275.

Zhu et al., "JOSIE: Overlap Set Similarity Search for Finding Joinable Tables in Data Lakes," SIGMOD '19, Amsterdam, Netherlands, Jun. 30-Jul. 5, 2019, pp. 847-864.

* cited by examiner

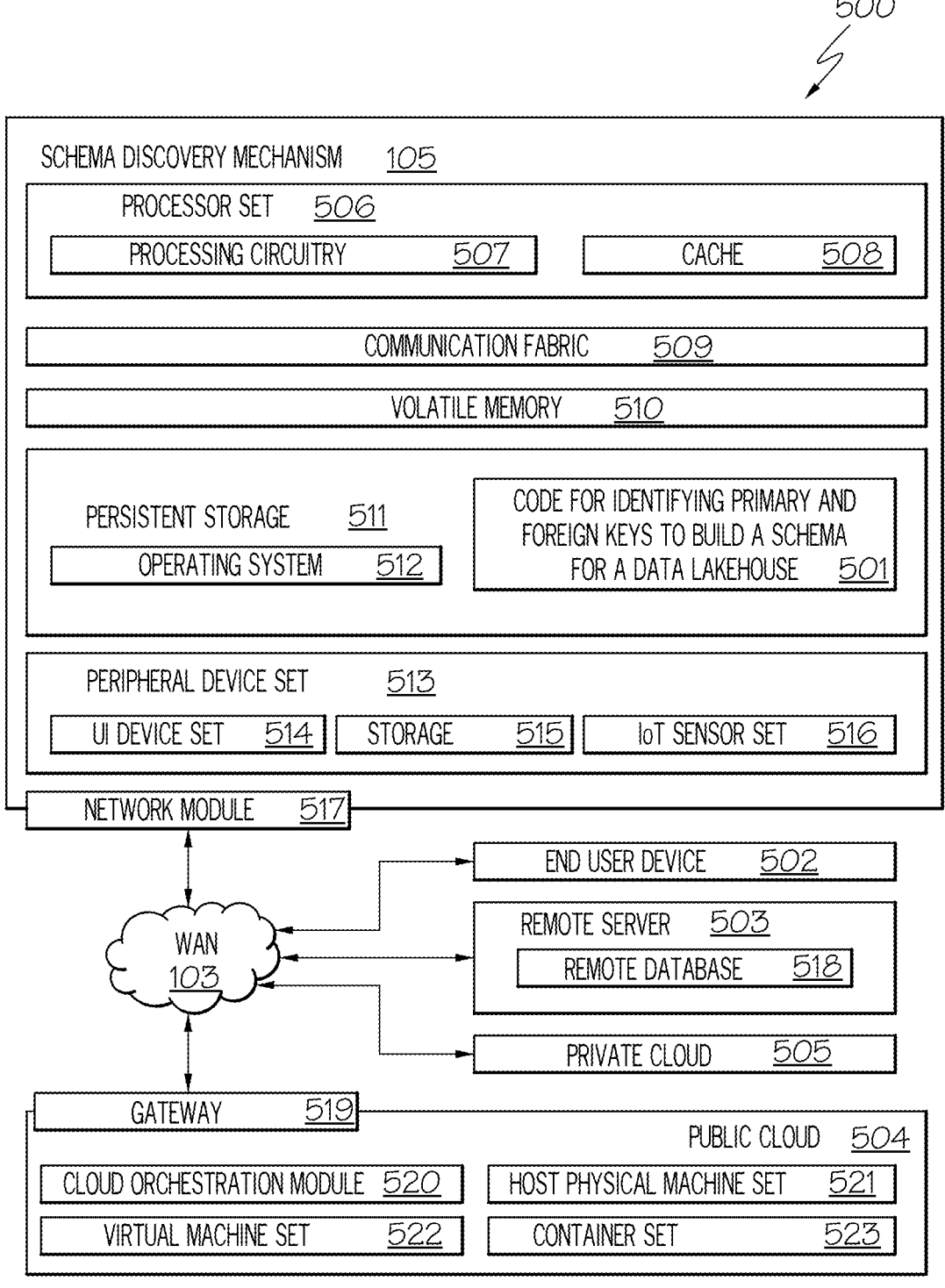

*500*

SCHEMA DISCOVERY MECHANISM      105

PROCESSOR SET      506

PROCESSING CIRCUITRY      507      CACHE      508

COMMUNICATION FABRIC      509

VOLATILE MEMORY      510

PERSISTENT STORAGE      511

OPERATING SYSTEM      512

CODE FOR IDENTIFYING PRIMARY AND FOREIGN KEYS TO BUILD A SCHEMA FOR A DATA LAKEHOUSE      501

PERIPHERAL DEVICE SET      513

UI DEVICE SET      514      STORAGE      515      IoT SENSOR SET      516

NETWORK MODULE      517

END USER DEVICE      502

REMOTE SERVER      503

REMOTE DATABASE      518

PRIVATE CLOUD      505

WAN 103

GATEWAY      519

PUBLIC CLOUD      504

CLOUD ORCHESTRATION MODULE      520      HOST PHYSICAL MACHINE SET      521

VIRTUAL MACHINE SET      522      CONTAINER SET      523

FIG. 5

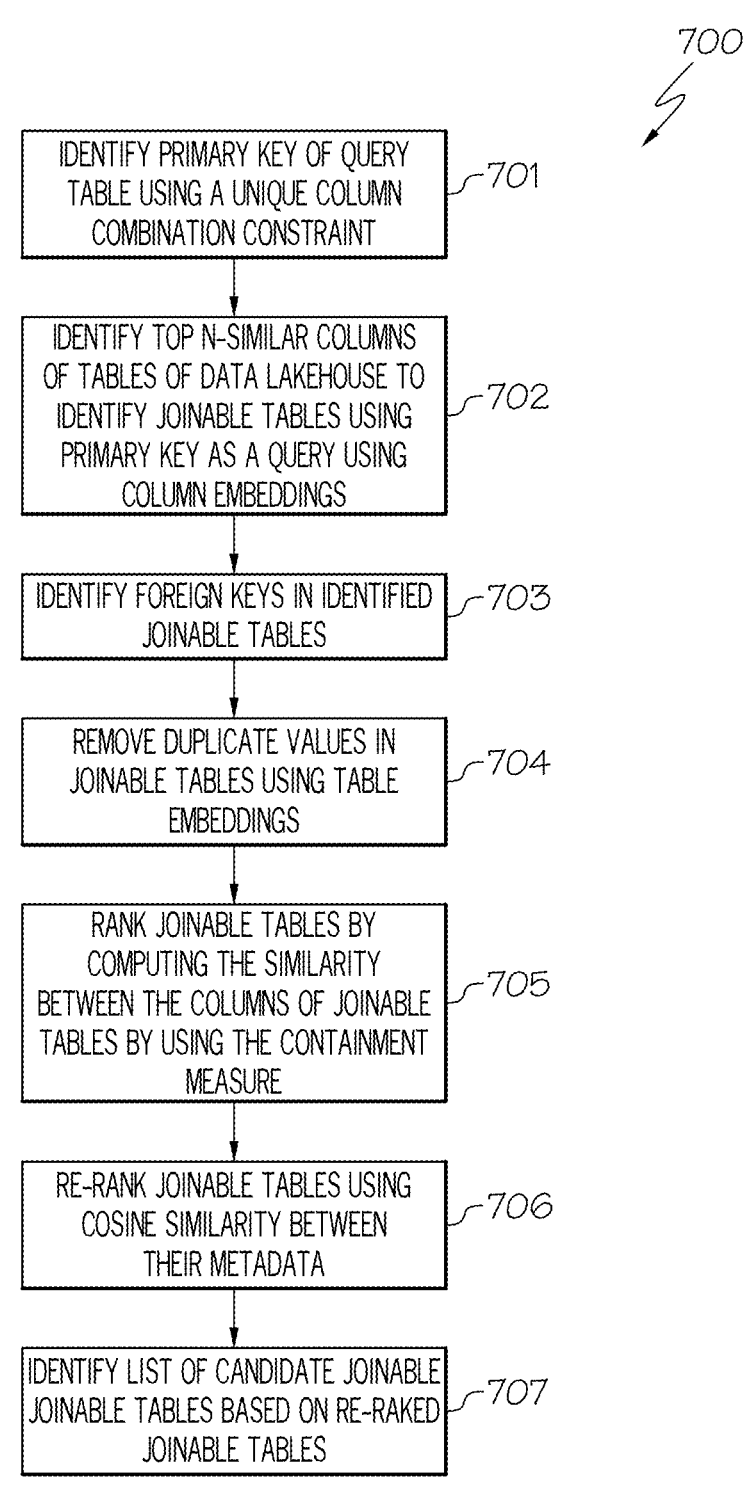

*700*

IDENTIFY PRIMARY KEY OF QUERY TABLE USING A UNIQUE COLUMN COMBINATION CONSTRAINT ⌐701

IDENTIFY TOP N-SIMILAR COLUMNS OF TABLES OF DATA LAKEHOUSE TO IDENTIFY JOINABLE TABLES USING PRIMARY KEY AS A QUERY USING COLUMN EMBEDDINGS ⌐702

IDENTIFY FOREIGN KEYS IN IDENTIFIED JOINABLE TABLES ⌐703

REMOVE DUPLICATE VALUES IN JOINABLE TABLES USING TABLE EMBEDDINGS ⌐704

RANK JOINABLE TABLES BY COMPUTING THE SIMILARITY BETWEEN THE COLUMNS OF JOINABLE TABLES BY USING THE CONTAINMENT MEASURE ⌐705

RE-RANK JOINABLE TABLES USING COSINE SIMILARITY BETWEEN THEIR METADATA ⌐706

IDENTIFY LIST OF CANDIDATE JOINABLE JOINABLE TABLES BASED ON RE-RAKED JOINABLE TABLES ⌐707

FIG. 7

DISCOVERING A SCHEMA FOR A DATA LAKEHOUSE BY IDENTIFYING THE PRIMARY AND FOREIGN KEYS

TECHNICAL FIELD

The present disclosure relates generally to a data lakehouse, and more particularly to discovering a schema for a data lakehouse by identifying the primary and foreign keys.

BACKGROUND

A data lakehouse is a modern data platform built from a combination of a data lake and a data warehouse. More specifically, a data lakehouse takes the flexible storage of structured data from a data lake and the management features and tools from data warehouses, then strategically implements them together as a larger system.

SUMMARY

In one embodiment of the present disclosure, a computer-implemented method for identifying primary and foreign keys to build a schema comprises identifying a primary key of a query table of a data lakehouse. The method further comprises identifying top n-similar columns of tables of the data lakehouse to identify joinable tables using the primary key as a query using column embeddings. The method additionally comprises identifying a list of candidate joinable tables based on the identified top n-similar columns of tables of the data lakehouse. Furthermore, the method comprises selecting joinable tables from the list of candidate join tables that satisfy an inclusion dependency constraint. Additionally, the method comprises identifying foreign keys having full containment with the primary key of the query table from the selected joinable tables.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 5 illustrates an embodiment of the present disclosure of the hardware configuration of the schema discovery mechanism which is representative of a hardware environment for practicing the present disclosure;

FIG. 7 is a flowchart of a method for identifying a list of candidate joinable tables in accordance with an embodiment of the present disclosure.

DETAILED DESCRIPTION

Figure 1:
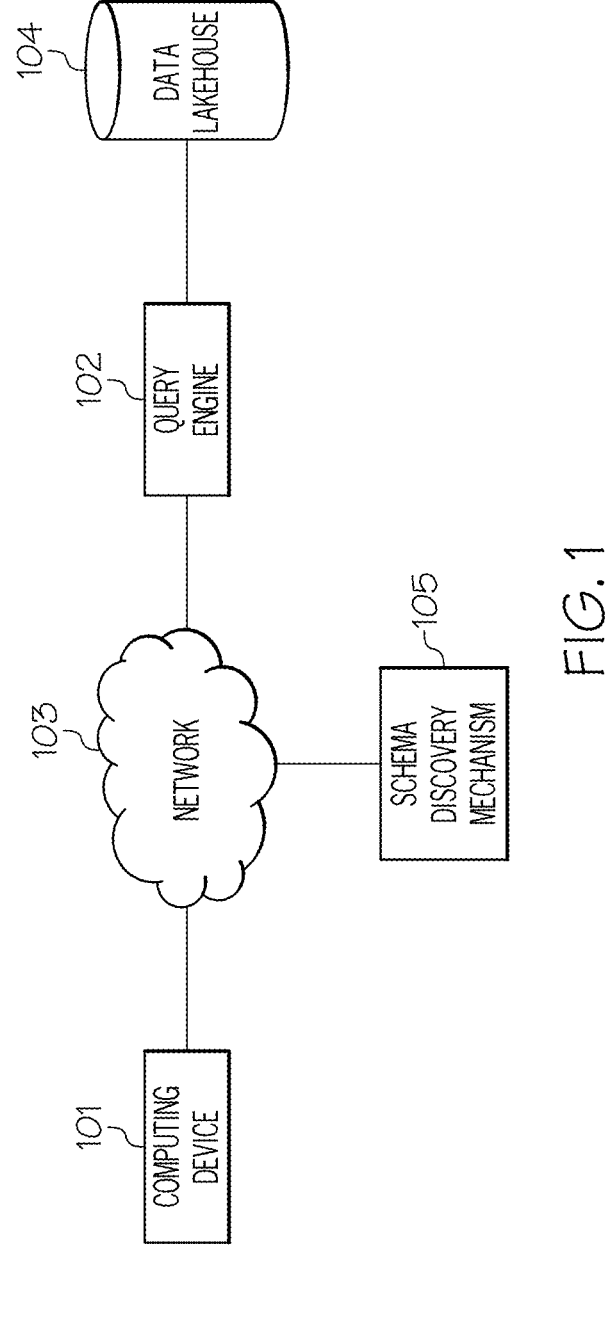
FIG. 1 illustrates a communication system for practicing the principles of the present disclosure in accordance with an embodiment of the present disclosure.

As stated above, a data lakehouse is a modern data platform built from a combination of a data lake and a data warehouse. More specifically, a data lakehouse takes the flexible storage of structured data from a data lake and the management features and tools from data warehouses, then strategically implements them together as a larger system.

Schema discovery is an essential factor in a data lakehouse's ability to support big data analytics. Weak discoverability makes data less accessible and undermines good governance practices. A schema is the organization or structure for a data lakehouse. An example of a schema is a relational schema, which defines the design and structure of the data structured in tables (called relations in relational schemas). The relational schema describes how those tables relate to each other. Schema discovery refers to finding and documenting the structure of data sources within a repository, such as a data lakehouse.

Schema discovery involves searching and retrieving metadata about the datasets in a data lakehouse's object storage. This metadata turns into schemas that define table structures and allow the creation of table and column previews to aid exploration and query development. For example, the schema can be used to identify joinable tables helping the user to write SQL (structured query language) queries.

By making schemas more discoverable, these features let companies maximize the value of their data lakehouses through expanded data accessibility, data integration, data virtualization, and data optimization. For example, by making schemas more discoverable, it is easier for engineers to discover schemas which streamlines pipeline development and helps eliminate internal barriers between data assets. Engineers can develop ingestion pipelines faster when they have reliable access to information about data sources. Likewise, discoverability tools can quickly identify schema changes that could disrupt existing pipelines. In another example, discoverability supports data optimization. The stale and inaccurate datasets become easier to find. Furthermore, engineers can integrate the schema into workflows that improve data quality, currency, and integrity.

A schema, such as a relational schema, for a data lakehouse can be built or discovered by identifying the primary and foreign keys to build the relational schema. Primary keys serve as unique identifiers for each row in a database table. Foreign keys link data in one table to the data in another table. A foreign key column in a table points to a column with unique values in another table (often the primary key column) to create a way of cross-referencing the two tables.

Unfortunately, due to the fact that a data lakehouse consists of a large set of data in tabular form, it is difficult to automatically identify the primary and foreign keys to build the schema, such as a relational schema.

The embodiments of the present disclosure provide a means for finding the foreign keys having full containment with the primary key of the query table from tables in the data lakehouse thereby being able to build/discover the schema, such as a relational schema, of the data lakehouse. In one embodiment, a primary key of a table of the data lakehouse is identified using a unique column combination constraint. The top n-similar columns of tables of the data lakehouse are identified to identify joinable tables using the primary key as a query using column embeddings. In one embodiment, such column embeddings are created based on a vector space model, which was created to represent objects in tables as vectors of identifiers using a column-hash sparse matrix that was created based on a hash map of the data lakehouse. A list of candidate joinable tables is identified based on the identified top n-similar columns of tables of the data lakehouse. Joinable tables from the list of candidate joinable tables are selected that satisfy an inclusion dependency constraint. The foreign keys having full containment with the primary key of a query table are then identified from the selected joinable tables. Such identified primary and foreign keys are utilized to build/discover the schema, such as a relational schema, of the data lakehouse. These and other features will be discussed in further detail below.

In some embodiments of the present disclosure, the present disclosure comprises a computer-implemented method, system, and computer program product for identifying primary and foreign keys to build a schema. In one embodiment of the present disclosure, a primary key of a query table of a data lakehouse, which may consist of multiple columns, is identified. A column, as used herein, is a list of values, usually belonging to a particular field, displayed vertically in a table. A query table, as used herein, is a named table that contains a database specific query. In one embodiment, the primary key of the query table is identified using a unique column combination constraint. The top n-similar columns of the tables of the data lakehouse are identified to identify the joinable tables using the primary key as a query using column embeddings. In one embodiment, the primary key is the column or columns that contain values that uniquely identify each row in a table. Column embeddings of such columns are then compared amongst each other using a similarity measure to identify the top n-similar columns. In one embodiment, such a similarity measure corresponds to cosine similarity or the Euclidean distance. In one embodiment, the higher the similarity measure, the greater the similarity between the columns associated with such column embeddings. A list of candidate joinable tables is identified based on the identified top n-similar columns of tables of the data lakehouse. Joinable tables from the list of candidate joinable tables are selected that satisfy an inclusion dependency constraint. Given two relations $R_i$, $R_j \in R$, $i \neq j$, an inclusion dependency (IND), denoted as $R_i[X] \subseteq R_j[Y]$, refers to having all the value entries in the column combination X being contained in the column combination Y. The foreign keys having full containment with the primary key of a query table are then identified from the selected joinable tables. Such identified primary and foreign keys are utilized to build/discover the schema, such as a relational schema, of the data lakehouse. In this manner, the primary and foreign keys are automatically identified to build the schema, such as a relational schema, of the data lakehouse.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill the relevant art.

Referring now to the Figures in detail, FIG. 1 illustrates an embodiment of the present disclosure of a communication system 100 for practicing the principles of the present disclosure. Communication system 100 includes a computing device 101 connected to a query engine 102 (e.g., structured query language (SQL) server) via a network 103. Furthermore, as illustrated in FIG. 1, query engine 102 is connected to a data lakehouse 104.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and query engine 102. It is noted that both computing device 101 and the user of computing device 101 may be identified with element number 101.

Network 103 may be, for example, a local area network, a wide area network, a wireless wide area network, a circuit-switched telephone network, a Global System for Mobile communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In one embodiment, the user of computing device 101 issues a query (e.g., SQL query) to query engine 102 (e.g., SQL server), such a JOIN clause used to combine rows from two or more tables of data lakehouse 104, based on a related column between them. Data lakehouse 104, as used herein, refers to a data platform built from a combination of a data lake and a data warehouse. More specifically, data lakehouse 104 takes the flexible storage of structured data from a data lake and the management features and tools from data warehouses, then strategically implements them together as a larger system. Query engine 102, as used herein, is configured to execute queries against data in data lakehouse 104 and provide answers for users, such as the user of computing device 101. Examples of query engine 102 can include, but are not limited to, MySQL®, IBM® Db2®, Microsoft Access®, SQLite®, Apache® Hive™, etc.

In one embodiment, the relational data of the tables of data lakehouse 104 may be located at various locations as opposed to a single location. Furthermore, the relational data of the tables of data lakehouse 104 may be stored in various formats, such as CSV, Apache® Parquet, JSON (JavaScript Object Notation), etc.

Furthermore, as shown in FIG. 1, system 100 includes a schema discovery mechanism 105 configured to identify the primary and foreign keys to build/discover a schema, such as a relational schema, of data lakehouse 104. A schema, as used herein, is the organization or structure for a data lakehouse. An example of a schema is a relational schema, which defines the design and structure of the data structured in tables (called relations in relational schemas). The relational schema describes how those tables relate to each other.

As discussed above, in one embodiment, schema discovery mechanism 105 is configured to build/discover a schema of data lakehouse 104. Schema discovery, as used herein, refers to finding and documenting the structure of data sources within a repository, such as data lakehouse 104.

A discussion regarding schema discovery mechanism 105 discovering the schema of data lakehouse 104 is provided below in connection with FIGS. 2-4 and 6-8.

A description of the software components of schema discovery mechanism 105 is provided below in connection with FIG. 2 and a description of the hardware configuration of schema discovery mechanism 105 is provided further below in connection with FIG. 5.

System 100 is not to be limited in scope to any one particular network architecture. System 100 may include any number of computing devices 101, query engines 102, networks 103, data lakehouses 104, and schema discovery mechanisms 105.

A discussion regarding the software components used by schema discovery mechanism 105 to discover the schema of data lakehouse 104 by identifying the primary and foreign keys to build/discover the schema of data lakehouse 104 is provided below in connection with FIG. 2.

Figure 2:
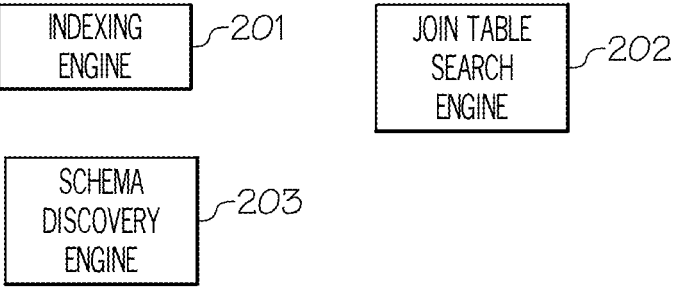
FIG. 2 is a diagram of the software components used by the schema discovery mechanism to discover the schema of the data lakehouse by identifying the primary and foreign keys to build/discover the schema of the data lakehouse in accordance with an embodiment of the present disclosure.

FIG. 2 is a diagram of the software components used by schema discovery mechanism 105 (FIG. 1) to discover the schema of data lakehouse 104 (FIG. 1) by identifying the primary and foreign keys to build/discover the schema of data lakehouse 104 in accordance with an embodiment of the present disclosure.

As shown in FIG. 2, schema discovery mechanism 105 includes an indexing engine 201 configured to vectorize the data extracted from data lakehouse 104.

Figure 3:
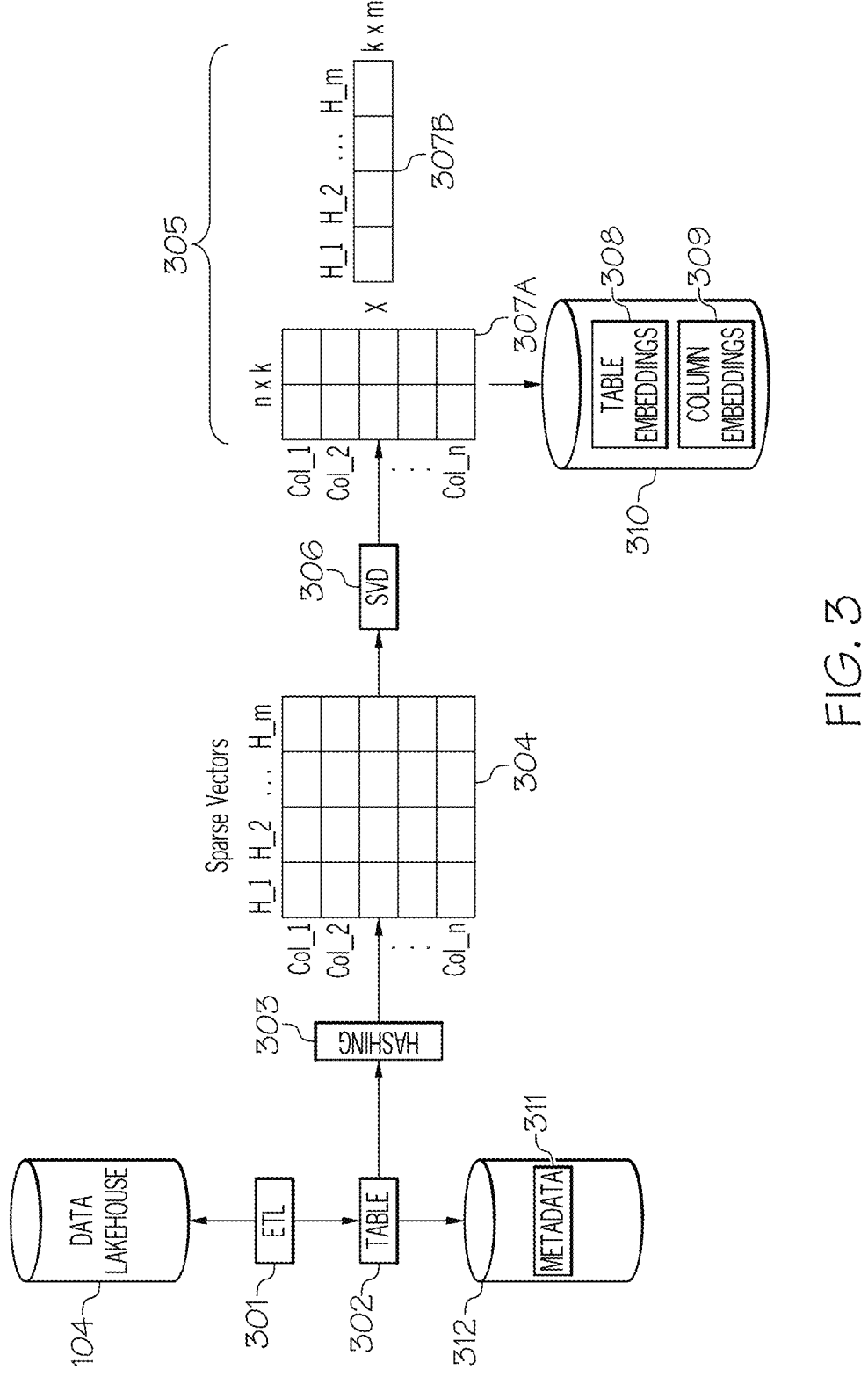
FIG. 3 illustrates indexing data from the data lakehouse in accordance with an embodiment of the present disclosure.

In one embodiment, indexing engine 201 extracts data from data lakehouse 104, such as via ETL (extract, transform, and load), to be vectorized as illustrated in FIG. 3.

FIG. 3 illustrates indexing data from data lakehouse 104 in accordance with an embodiment of the present disclosure.

As illustrated in FIG. 3, indexing engine 201 extracts data from data lakehouse 104 via ETL 301, which extracts, transforms, and loads the data from data lakehouse 104 into a table 302.

Referring to FIG. 2, in conjunction with FIGS. 1 and 3, in one embodiment, indexing engine 201 creates a hash map by hashing 303 each value of the data in table 302. Hashing, as used herein, refers to the process of transforming the value of the data in table 302 into another value. A hash map, as used herein, is a data structure that pairs keys to values. Keys provide the means for database users and application software to identify, access, and update information in a database table. There may be several keys in any given table. For example, in a table of employees, both employee number and login name are individually unique. A value is the representation of some entity that can be manipulated by a program.

In one embodiment, indexing engine 201 creates a fixed-sized hash map by hashing each value of the data in table 302 using the MurmurHash function. The MurmurHash function is a non-cryptographic hash function designed for high performance hash table use cases.

In one embodiment, indexing engine 201 creates a column-hash sparse matrix 304 based on the hash map. A sparse matrix, as used herein, refers to a matrix in which most of the elements are zero. In one embodiment, the representations of column-hash sparse matrix 304 are formed based on the relationship between the columns ("col") and hash values ("h") of the hash map. Such a relationship forms the sparse vectors of column-hash sparse matrix 304. In one embodiment, indexing engine 201 utilizes various software tools for creating column-hash sparse matrix 304 based on the hash map, which can include, but are not limited to, MatrixTools, Tableau®, Ketch®, etc.

In one embodiment, indexing engine 201 creates a vector space model 305 to represent objects in tables as vectors of identifiers, such as by applying single value decomposition (SVD) 306 using random indexing to compress column-hash sparse matrix 304 into two dense matrices 307A, 307B of vector space model 305. A vector space model 305, as used herein, is an algebraic model for representing items (e.g., text documents of tables of data lakehouse 104) as vectors such that the distance between vectors represents the relevance between the items. Single value decomposition, as used herein, is a factorization of a real or complex matrix into a rotation, followed by a rescaling followed by another rotation. In one embodiment, indexing engine 201 decomposes column-hash sparse matrix 304 using the singular value decomposition (SVD) algorithm using various software tools, which can include, but are not limited to, MathWorks®, Mathematica®, etc.

In one embodiment, indexing engine 201 creates table embeddings 308 and column embeddings 309 using vector space model 305. Such embeddings 308, 309 convert complex data, such as text, images, or sounds, into vector form, making it computationally manageable. In particular, table embeddings 308 are a relatively low-dimensional space into which one can translate high-dimensional vectors of table data (e.g., name of table). Column embeddings 309 are a relatively low-dimensional space into which one can translate high-dimensional vectors of column data (e.g., data of column).

In one embodiment, indexing engine 201 stores dense matrix 307A into an approximate nearest neighbors (ANN) index or database 310 (e.g., vector database), where each row of dense matrix 307A is a column embedding 309. In one embodiment, indexing engine 201 creates table embeddings 308 by averaging column embeddings 309 associated with the columns of each table.

Furthermore, in one embodiment, table embeddings 308 and column embeddings 309 are stored into an approximate nearest neighbors (ANN) index or database 310 (e.g., vector database). The ANN algorithm seeks approximate nearest neighbors as opposed to exact matches. A vector database is a type of database that stores data as high-dimensional vectors, which are mathematical representations of features or attributes.

Additionally, in one embodiment, metadata 311, such as key-value pairs, from the original data in table 302 are stored in database 312. A key-value pair consists of two related data elements: a key, which is a constant that defines the data set (e.g., gender, color, price), and a value, which is a variable that belongs to the set (e.g., male/female, green, 100). In one embodiment, indexing engine 201 extracts such metadata 311 (key-value pairs) from the original data in table 302 using various software tools, which can include, but are not limited to, key-value pair extraction tool by Alteryx®, Abto key-value data extraction tool, etc.

Referring to FIG. 2, in conjunction with FIG. 1, additionally, schema discovery mechanism 105 includes join table search engine 202 configured to identify candidate joinable tables from data lakehouse 104.

In one embodiment, join table search engine 202 identifies the primary key of a query table of data lakehouse 104, which may consist of multiple columns. A column, as used herein, is a list of values, usually belonging to a particular field, displayed vertically in a table. A query table, as used herein, is a named table that contains a database specific query.

Figure 4:
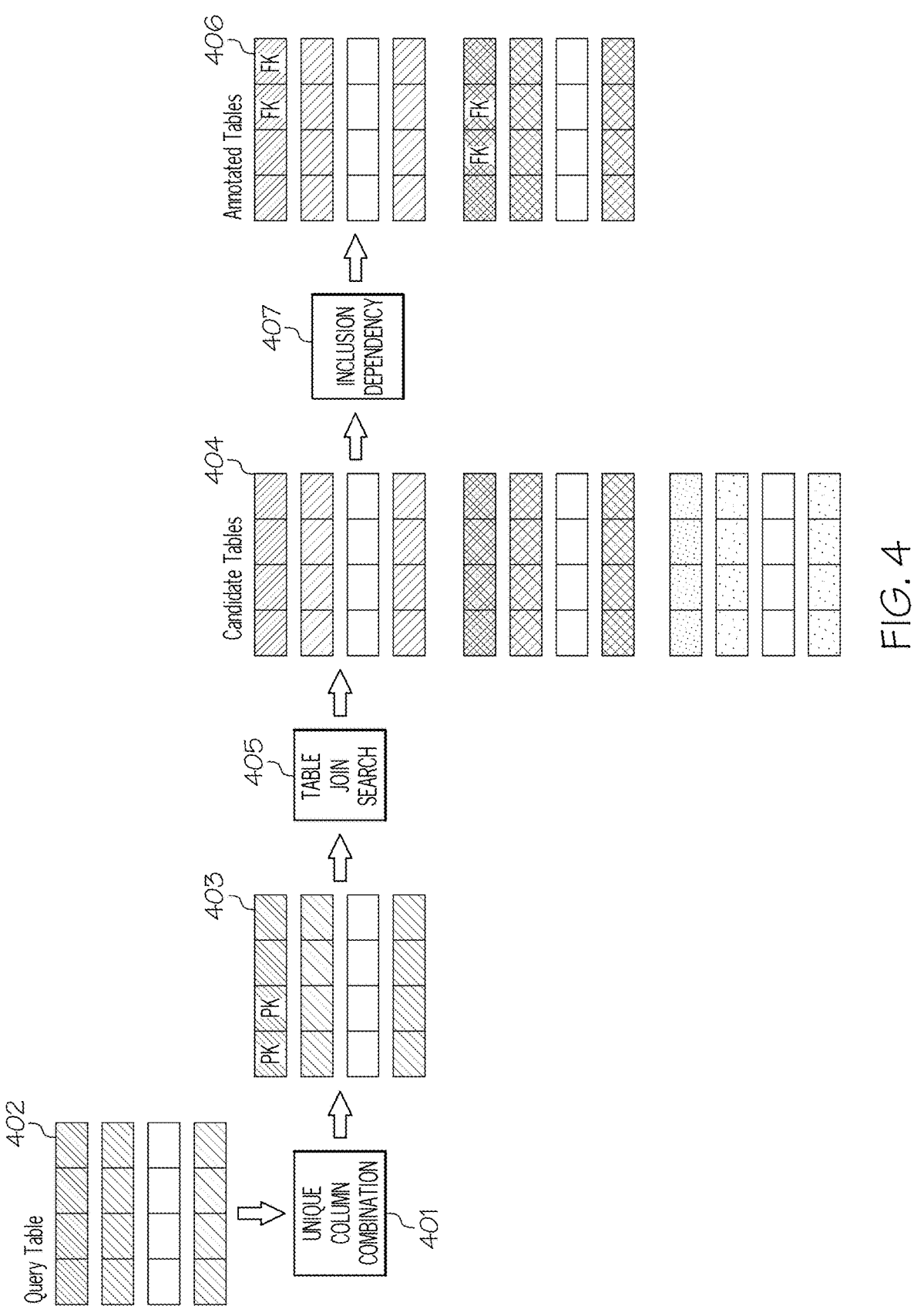
FIG. 4 illustrates discovering the schema of the data lakehouse in accordance with an embodiment of the present disclosure.

In one embodiment, join table search engine 202 identifies the primary key of the query table using a unique column combination constraint as illustrated in FIG. 4.

FIG. 4 illustrates discovering the schema of data lakehouse 104 in accordance with an embodiment of the present disclosure.

As shown in FIG. 4, a unique column combination 401 is applied to query table 402 in order to obtain a table 403 of primary keys (PK). Given a relation R with its instance r, a unique column combination (UCC) is a set of attributes X⊆R whose projection contains only unique, non-null value entries on r.

Referring to FIG. 2, join table search engine 202 identifies the top n-similar columns of the tables of data lakehouse 104 to identify the joinable tables using the primary key as a query using column embeddings 309.

In one embodiment, the primary key is the column or columns that contain values that uniquely identify each row in a table. Column embeddings 309 of such columns are then compared amongst each other using a similarity measure to identify the top n-similar columns. In one embodiment, such a similarity measure corresponds to cosine similarity or the Euclidean distance. In one embodiment, the higher the similarity measure, the greater the similarity between the columns associated with such column embeddings 309.

"Cosine similarity," as used herein, refers to a measure of similarity between two non-zero vectors defined in an inner product space. Cosine similarity is the cosine of the angle between the vectors. That is, it is the dot product of the vectors divided by the product of their lengths. The higher the similarity measure, the greater the similarity between the columns associated with such column embeddings 309.

In one embodiment, the Euclidean distance is calculated as the square root of the sum of the squared differences between the two feature vectors. The smaller the distance, the greater the similarity between the columns associated with such column embeddings 309.

In one embodiment, the similarity measure is a score between the values of 0 and 1 for vectors that have only positive values. In one embodiment, any negative scores can be made positive by taking its absolute value.

In one embodiment, the tables associated with the top n-similar columns of the tables of data lakehouse 104 form a set of joinable tables.

In one embodiment, join table search engine 202 identifies the foreign keys in the identified joinable tables. Foreign keys, as used herein, link data in one table to the data in another table. A foreign key column in a table points to a column with unique values in another table (often the primary key column) to create a way of cross-referencing the two tables.

In one embodiment, join table search engine 202 identifies the foreign keys in the identified joinable tables by running a key and cross-domain analysis on the compatible column pairs of the joinable tables. In one embodiment, join table search engine 202 utilizes various software tools for identifying the foreign keys in the identified joinable tables, such as InfoSphere.

In one embodiment, join table search engine 202 identifies the foreign keys in the identified joinable tables by using the Levenshtein distances of column names to find foreign key relationships.

In one embodiment, join table search engine 202 removes the duplicate values/records in the joinable tables using table embeddings 308 by comparing table embeddings 308 amongst each other to identify duplicate table embeddings and then removing the duplicate values in the joinable tables associated with such duplicate table embeddings.

Furthermore, in one embodiment, join table search engine 202 ranks the joinable tables (after removing duplicate values/records) by computing the similarity between the columns of joinable tables by using the containment measure. The "containment measure," as used herein, measures the degree of containment between two sets of columns to determine which members are shared and distinct. In one embodiment, the containment measure corresponds to the distance between two column embeddings 309 using cosine similarity.

As discussed above, cosine similarity refers to a measure of similarity between two non-zero vectors defined in an inner product space. Cosine similarity is the cosine of the angle between the vectors. That is, it is the dot product of the vectors divided by the product of their lengths. The higher the similarity measure, the greater the similarity between the candidate joinable tables associated with such column embeddings 309.

As also discussed above, in one embodiment, join table search engine 202 ranks the joinable tables based on the containment measurement (e.g., cosine similarity measurement). The higher the containment measurement (e.g., cosine similarity measurement), the higher the ranked joinable table.

In one embodiment, join table search engine 202 re-ranks the joinable tables using cosine similarity between their metadata. In one embodiment, join table search engine 202 re-ranks the joinable tables using cosine similarity between the metadata (e.g., metadata 311) associated with the query table and each of the candidate joinable tables.

In one embodiment, such metadata (e.g., metadata 311) corresponds to the key-value pairs that were stored in database 312.

As discussed above, cosine similarity refers to a measure of similarity between two non-zero vectors defined in an inner product space. Cosine similarity is the cosine of the angle between the vectors. That is, it is the dot product of the vectors divided by the product of their lengths. The higher the similarity measure, the greater the similarity between the candidate joinable tables associated with such metadata.

In one embodiment, the cosine similarity measure is a score between the values of 0 and 1 for vectors that have only positive values.

In one embodiment, join table search engine 202 identifies a list of candidate joinable tables based on the re-ranked joinable tables as illustrated in FIG. 4, where higher ranked joinable tables are listed prior to lower ranked joinable tables.

Returning to FIG. 4, a list of candidate joinable tables 404 is formed from the table join search 405 performed by join table search engine 202 discussed above.

Returning to FIG. 2, in conjunction with FIGS. 1 and 3-4, schema discovery mechanism 105 further includes schema discovery engine 203 configured to discover the scheme for data lakehouse 104.

In one embodiment, schema discovery engine 203 is configured to select joinable tables from the list of candidate joinable tables that satisfy an inclusion dependency constraint as illustrated in FIG. 4.

As shown in FIG. 4, a portion of the joinable tables 406 from the list of candidate joinable tables 404 that satisfy an inclusion dependency constraint 407 are selected (such joinable tables 406 are referred to as the annotated tables).

In one embodiment, given two relations $R_i$, $R_j \in R$, i=j, an inclusion dependency (IND), denoted as $R_i[X] \subseteq R_j[Y]$, refers to having all the value entries in the column combination X being contained in the column combination Y.

Furthermore, in one embodiment, schema discovery engine 203 identifies the foreign keys having full containment with the primary key of the query table from the selected joinable tables. As discussed above, the query table is a named table that contains a database specific query. In one embodiment, such foreign keys are identified based on the foreign keys previously identified by indexing engine 201, which are associated with the selected joinable tables. Furthermore, as discussed above, the primary key of the query table refers to the primary key discussed above in connection with indexing engine 201, which was identified using a unique column combination constraint.

In this manner, by identifying the foreign keys having full containment with the primary key of a query table from the selected joinable tables, such identified primary and foreign keys are utilized to build/discover the schema, such as a relational schema, of data lakehouse 104.

A further description of these and other features is provided below in connection with the discussion of the method for identifying primary and foreign keys to build a schema, such as a relational schema, for data lakehouse 104.

Prior to the discussion of the method for identifying primary and foreign keys to build a schema, such as a relational schema, for data lakehouse 104, a description of the hardware configuration of schema discovery mechanism 105 (FIG. 1) is provided below in connection with FIG. 5.

Referring now to FIG. 5, in conjunction with FIG. 1, FIG. 5 illustrates an embodiment of the present disclosure of the hardware configuration of schema discovery mechanism 105 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code (stored in block 501) involved in performing the inventive methods, such as identifying primary and foreign keys to build a schema, such as a relational schema, for data lakehouse 104. In addition to block 501, computing environment 500 includes, for example, schema discovery mechanism 105, network 103, such as a wide area network (WAN), end user device (EUD) 502, remote server 503, public cloud 504, and private cloud 505. In this embodiment, schema discovery mechanism 105 includes processor set 506 (including processing circuitry 507 and cache 508), communication fabric 509, volatile memory 510, persistent storage 511 (including operating system 512 and block 501, as identified above), peripheral device set 513 (including user interface (UI) device set 514, storage 515, and Internet of Things (IoT) sensor set 516), and network module 517. Remote server 503 includes remote database 518. Public cloud 504 includes gateway 519, cloud orchestration module 520, host physical machine set 521, virtual machine set 522, and container set 523.

Schema discovery mechanism 105 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 518. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically schema discovery mechanism 105, to keep the presentation as simple as possible. Schema discovery mechanism 105 may be located in a cloud, even though it is not shown in a cloud in FIG. 5. On the other hand, schema discovery mechanism 105 is not required to be in a cloud except to any extent as may be affirmatively indicated.

Processor set 506 includes one, or more, computer processors of any type now known or to be developed in the future. Processing circuitry 507 may be distributed over multiple packages, for example, multiple, coordinated integrated circuit chips. Processing circuitry 507 may implement multiple processor threads and/or multiple processor cores. Cache 508 is memory that is located in the processor chip package(s) and is typically used for data or code that should be available for rapid access by the threads or cores running on processor set 506. Cache memories are typically organized into multiple levels depending upon relative proximity to the processing circuitry. Alternatively, some, or all, of the cache for the processor set may be located "off chip." In some computing environments, processor set 506 may be designed for working with qubits and performing quantum computing.

Computer readable program instructions are typically loaded onto schema discovery mechanism 105 to cause a series of operational steps to be performed by processor set 506 of schema discovery mechanism 105 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 508 and the other storage media discussed below. The program instructions, and associated data, are accessed by processor set 506 to control and direct performance of the inventive methods. In computing environment 500, at least some of the instructions for performing the inventive methods may be stored in block 501 in persistent storage 511.

Communication fabric 509 is the signal conduction paths that allow the various components of schema discovery mechanism 105 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 510 is any type of volatile memory now known or to be developed in the future. Examples include dynamic type random access memory (RAM) or static type RAM. Typically, the volatile memory is characterized by random access, but this is not required unless affirmatively indicated. In schema discovery mechanism 105, the volatile memory 510 is located in a single package and is internal to schema discovery mechanism 105, but, alternatively or additionally, the volatile memory may be distributed over multiple packages and/or located externally with respect to schema discovery mechanism 105.

Persistent Storage 511 is any form of non-volatile storage for computers that is now known or to be developed in the future. The non-volatility of this storage means that the stored data is maintained regardless of whether power is being supplied to schema discovery mechanism 105 and/or directly to persistent storage 511. Persistent storage 511 may be a read only memory (ROM), but typically at least a portion of the persistent storage allows writing of data, deletion of data and re-writing of data. Some familiar forms of persistent storage include magnetic disks and solid state storage devices. Operating system 512 may take several forms, such as various known proprietary operating systems or open source Portable Operating System Interface type operating systems that employ a kernel. The code included in block 501 typically includes at least some of the computer code involved in performing the inventive methods.

Peripheral device set 513 includes the set of peripheral devices of schema discovery mechanism 105. Data communication connections between the peripheral devices and the other components of schema discovery mechanism 105 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 514 may include components such as a display screen, speaker, microphone, wearable devices (such as goggles and smart watches), keyboard, mouse, printer, touchpad, game controllers, and haptic devices. Storage 515 is external storage, such as an external hard drive, or insertable storage, such as an SD card. Storage 515 may be persistent and/or volatile. In some embodiments, storage 515 may take the form of a quantum computing storage device for storing data in the form of qubits. In embodiments where schema discovery mechanism 105 is required to have a large amount of storage (for example, where schema discovery mechanism 105 locally stores and manages a large database) then this storage may be provided by peripheral storage devices designed for storing very large amounts of data, such as a storage area network (SAN) that is shared by multiple, geographically distributed computers. IoT sensor set 516 is made up of sensors that can be used in Internet of Things applications. For example, one sensor may be a thermometer and another sensor may be a motion detector.

Network module 517 is the collection of computer software, hardware, and firmware that allows schema discovery mechanism 105 to communicate with other computers through WAN 103. Network module 517 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 517 are performed on the same physical hardware device. In other embodiments (for example, embodiments that utilize software-defined networking (SDN)), the control functions and the forwarding functions of network module 517 are performed on physically separate devices, such that the control functions manage several different network hardware devices. Computer readable program instructions for performing the inventive methods can typically be downloaded to schema discovery mechanism 105 from an external computer or external storage device through a network adapter card or network interface included in network module 517.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 502 is any computer system that is used and controlled by an end user (for example, a customer of an enterprise that operates schema discovery mechanism 105), and may take any of the forms discussed above in connection with schema discovery mechanism 105. EUD 502 typically receives helpful and useful data from the operations of schema discovery mechanism 105. For example, in a hypothetical case where schema discovery mechanism 105 is designed to provide a recommendation to an end user, this recommendation would typically be communicated from network module 517 of schema discovery mechanism 105 through WAN 103 to EUD 502. In this way, EUD 502 can display, or otherwise present, the recommendation to an end user. In some embodiments, EUD 502 may be a client device, such as thin client, heavy client, mainframe computer, desktop computer and so on.

Remote server 503 is any computer system that serves at least some data and/or functionality to schema discovery mechanism 105. Remote server 503 may be controlled and used by the same entity that operates schema discovery mechanism 105. Remote server 503 represents the machine(s) that collect and store helpful and useful data for use by other computers, such as schema discovery mechanism 105. For example, in a hypothetical case where schema discovery mechanism 105 is designed and programmed to provide a recommendation based on historical data, then this historical data may be provided to schema discovery mechanism 105 from remote database 518 of remote server 503.

Public cloud 504 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 504 is performed by the computer hardware and/or software of cloud orchestration module 520. The computing resources provided by public cloud 504 are typically implemented by virtual computing environments that run on various computers making up the computers of host physical machine set 521, which is the universe of physical computers in and/or available to public cloud 504. The virtual computing environments (VCEs) typically take the form of virtual machines from virtual machine set 522 and/or containers from container set 523. It is understood that these VCEs may be stored as images and may be transferred among and between the various physical machine hosts, either as images or after instantiation of the VCE. Cloud orchestration module 520 manages the transfer and storage of images, deploys new instantiations of VCEs and manages active instantiations of VCE deployments. Gateway 519 is the collection of computer software, hardware, and firmware that allows public cloud 504 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 505 is similar to public cloud 504, except that the computing resources are only available for use by a single enterprise. While private cloud 505 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 504 and private cloud 505 are both part of a larger hybrid cloud.

Block 501 further includes the software components discussed above in connection with FIGS. 2-4 to identify primary and foreign keys to build a schema, such as a relational schema, for data lakehouse 104. In one embodiment, such components may be implemented in hardware. The functions discussed above performed by such components are not generic computer functions. As a result, schema discovery mechanism 105 is a particular machine that is the result of implementing specific, non-generic computer functions.

In one embodiment, the functionality of such software components of schema discovery mechanism 105, including the functionality for identifying primary and foreign keys to build a schema, such as a relational schema, for data lakehouse 104, may be embodied in an application specific integrated circuit.

As stated above, schema discovery is an essential factor in a data lakehouse's ability to support big data analytics. Weak discoverability makes data less accessible and undermines good governance practices. A schema is the organization or structure for a data lakehouse. An example of a schema is a relational schema, which defines the design and structure of the data structured in tables (called relations in relational schemas). The relational schema describes how those tables relate to each other. Schema discovery refers to finding and documenting the structure of data sources within a repository, such as a data lakehouse. Schema discovery involves searching and retrieving metadata about the datasets in a data lakehouse's object storage. This metadata turns into schemas that define table structures and allow the creation of table and column previews to aid exploration and query development. For example, the schema can be used to identify joinable tables helping the user to write SQL (structured query language) queries. By making schemas more discoverable, these features let companies maximize the value of their data lakehouses through expanded data accessibility, data integration, data virtualization, and data optimization. For example, by making schemas more discoverable, it is easier for engineers to discover schemas which streamlines pipeline development and helps eliminate internal barriers between data assets. Engineers can develop ingestion pipelines faster when they have reliable access to information about data sources. Likewise, discoverability tools can quickly identify schema changes that could disrupt existing pipelines. In another example, discoverability supports data optimization. The stale and inaccurate datasets become easier to find. Furthermore, engineers can integrate the schema into workflows that improve data quality, currency, and integrity. A schema, such as a relational schema, for a data lakehouse can be built or discovered by identifying the primary and foreign keys to build the relational schema. Primary keys serve as unique identifiers for each row in a database table. Foreign keys link data in one table to the data in another table. A foreign key column in a table points to a column with unique values in another table (often the primary key column) to create a way of cross-referencing the two tables. Unfortunately, due to the fact that a data lakehouse consists of a large set of data in tabular form, it is difficult to automatically identify the primary and foreign keys to build the schema, such as a relational schema.

Figure 6:
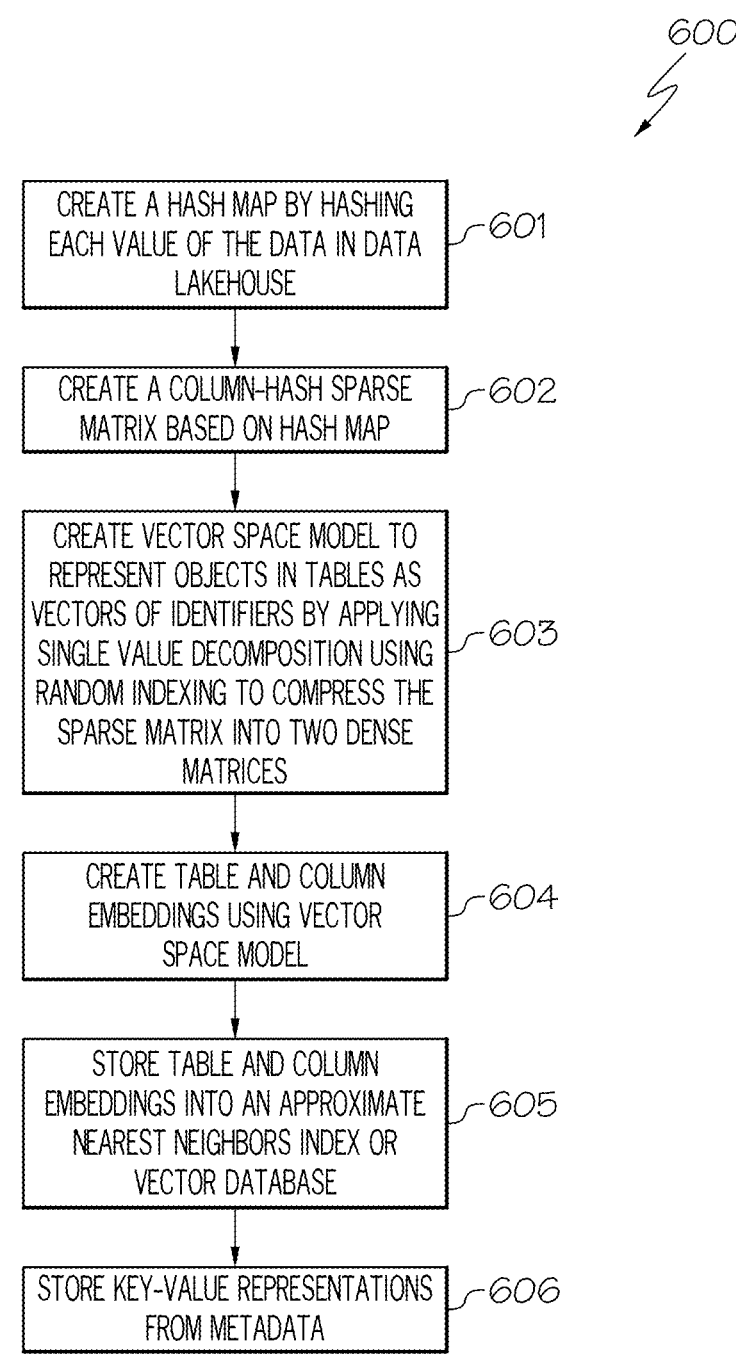
FIG. 6 is a flowchart of a method for indexing a data lakehouse in accordance with an embodiment of the present disclosure.
Figure 8:
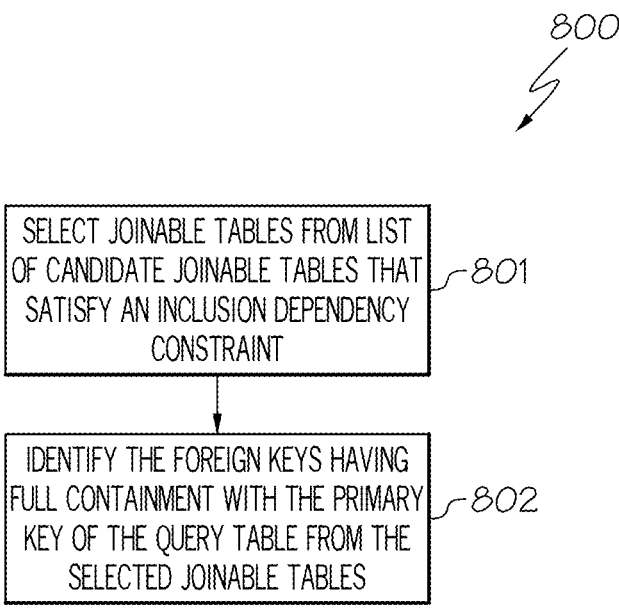
FIG. 8 is a flowchart of a method for discovering the schema of the data lakehouse in accordance with an embodiment of the present disclosure.

The embodiments of the present disclosure provide a means for finding the foreign keys having full containment with the primary key of the query table from tables in the data lakehouse thereby being able to build/discover the schema, such as a relational schema, of the data lakehouse (e.g., data lakehouse 104) as discussed below in connection with FIGS. 6-8. FIG. 6 is a flowchart of a method for indexing a data lakehouse (e.g., data lakehouse 104). FIG. 7 is a flowchart of a method for identifying a list of candidate joinable tables. FIG. 8 is a flowchart of a method for discovering the schema of the data lakehouse (e.g., data lakehouse 104).

As stated above, FIG. 6 is a flowchart of a method 600 for indexing a data lakehouse (e.g., data lakehouse 104) in accordance with an embodiment of the present disclosure.

Referring to FIG. 6, in conjunction with FIGS. 1-5, in operation 601, indexing engine 201 of schema discovery mechanism 105 creates a hash map by hashing each value of the data in data lakehouse 104.

As discussed above, indexing engine 201 extracts data from data lakehouse 104 via ETL 301, which extracts, transforms, and loads the data from data lakehouse 104 into table 302.

In one embodiment, indexing engine 201 creates a hash map by hashing 303 each value of the data in table 302. Hashing, as used herein, refers to the process of transforming the value of the data in table 302 into another value. A hash map, as used herein, is a data structure that pairs keys to values. Keys provide the means for database users and application software to identify, access, and update information in a database table. There may be several keys in any given table. For example, in a table of employees, both employee number and login name are individually unique. A value is the representation of some entity that can be manipulated by a program.

In one embodiment, indexing engine 201 creates a fixed-sized hash map by hashing each value of the data in table 302 using the MurmurHash function. The MurmurHash function is a non-cryptographic hash function designed for high performance hash table use cases.

In operation 602, indexing engine 201 of schema discovery mechanism 105 creates a column-hash sparse matrix 304 based on the hash map.

As stated above, a sparse matrix, as used herein, refers to a matrix in which most of the elements are zero. In one embodiment, the representations of column-hash sparse matrix 304 are formed based on the relationship between the columns ("col") and hash values ("h") of the hash map. Such a relationship forms the sparse vectors of column-hash sparse matrix 304. In one embodiment, indexing engine 201 utilizes various software tools for creating column-hash sparse matrix 304 based on the hash map, which can include, but are not limited to, MatrixTools, Tableau®, Ketch®, etc.

In operation 603, indexing engine 201 of schema discovery mechanism 105 creates a vector space model 305 to represent objects in tables as vectors of identifiers, such as by applying single value decomposition (SVD) 306 using random indexing to compress column-hash sparse matrix 304 into two dense matrices 307A, 307B of vector space model 305.

As discussed above, a vector space model 305, as used herein, is an algebraic model for representing items (e.g., text documents of tables of data lakehouse 104) as vectors such that the distance between vectors represents the relevance between the items. Single value decomposition, as used herein, is a factorization of a real or complex matrix into a rotation, followed by a rescaling followed by another rotation. In one embodiment, indexing engine 201 decomposes column-hash sparse matrix 304 using the singular value decomposition (SVD) algorithm using various software tools, which can include, but are not limited to, Math Works®, Mathematica®, etc.

In operation 604, indexing engine 201 of schema discovery mechanism 105 creates table embeddings 308 and column embeddings 309 using vector space model 305.

As stated above, such embeddings 308, 309 convert complex data, such as text, images, or sounds, into vector form, making it computationally manageable. In particular, table embeddings 308 are a relatively low-dimensional space into which one can translate high-dimensional vectors of table data (e.g., name of table). Column embeddings 309 are a relatively low-dimensional space into which one can translate high-dimensional vectors of column data (e.g., data of column). In one embodiment, table embeddings 308 and column embeddings 309 are stored in a database 310, such as a vector database, which stores data as vectors, which are mathematical representations of features or attributes.

In one embodiment, indexing engine 201 stores dense matrix 307A into an approximate nearest neighbors (ANN) index or database 310 (e.g., vector database), where each row of dense matrix 307A is a column embedding 309. In one embodiment, indexing engine 201 creates table embeddings 308 by averaging column embeddings 309 associated with the columns of each table.

In operation 605, indexing engine 201 of schema discovery mechanism 105 stores table embeddings 308 and column embeddings 309 into an approximate nearest neighbors (ANN) index or database 310 (e.g., vector database).

As discussed above, the ANN algorithm seeks approximate nearest neighbors as opposed to exact matches. A vector database is a type of database that stores data as high-dimensional vectors, which are mathematical representations of features or attributes.

In operation 606, indexing engine 201 of schema discovery mechanism 105 stores key-value representations (i.e., key-value pairs) from metadata 311.

As stated above, metadata 311, such as key-value pairs, from the original data in table 302 are stored in database 312. A key-value pair consists of two related data elements: a key, which is a constant that defines the data set (e.g., gender, color, price), and a value, which is a variable that belongs to the set (e.g., male/female, green, 100). In one embodiment, indexing engine 201 extracts such metadata 311 (key-value pairs) from the original data in table 302 using various software tools, which can include, but are not limited to, key-value pair extraction tool by Alteryx®, Abto key-value data extraction tool, etc.

Upon indexing data lakehouse 104, a list of candidate joinable tables of data lakehouse 104 is identified as discussed below in connection with FIG. 7.

FIG. 7 is a flowchart of a method 700 for identifying a list of candidate joinable tables in accordance with an embodiment of the present disclosure.

Referring to FIG. 7, in conjunction with FIGS. 1-6, in operation 701, join table search engine 202 of schema discovery mechanism 105 identifies the primary key of a query table of data lakehouse 104, which may consist of multiple columns. A column, as used herein, is a list of values, usually belonging to a particular field, displayed vertically in a table. A query table, as used herein, is a named table that contains a database specific query.

As discussed above, in one embodiment, join table search engine 202 identifies the primary key of the query table using a unique column combination constraint as illustrated in FIG. 4.

As shown in FIG. 4, a unique column combination 401 is applied to query table 402 in order to obtain a table 403 of primary keys (PK). Given a relation R with its instance r, a unique column combination (UCC) is a set of attributes X @ R whose projection contains only unique, non-null value entries on r.

In operation 702, join table search engine 202 of schema discovery mechanism 105 identifies the top n-similar columns of the tables of data lakehouse 104 to identify the joinable tables using the primary key as a query using column embeddings 309.

In one embodiment, the primary key is the column or columns that contain values that uniquely identify each row in a table. Column embeddings 309 of such columns are then compared amongst each other using a similarity measure to identify the top n-similar columns. In one embodiment, such a similarity measure corresponds to cosine similarity or the Euclidean distance. In one embodiment, the higher the similarity measure, the greater the similarity between the columns associated with such column embeddings 309.

"Cosine similarity," as used herein, refers to a measure of similarity between two non-zero vectors defined in an inner product space. Cosine similarity is the cosine of the angle between the vectors. That is, it is the dot product of the vectors divided by the product of their lengths. The higher the similarity measure, the greater the similarity between the columns associated with such column embeddings 309.

In one embodiment, the Euclidean distance is calculated as the square root of the sum of the squared differences between the two feature vectors. The smaller the distance, the greater the similarity between the columns associated with such column embeddings 309.

In one embodiment, the similarity measure is a score between the values of 0 and 1 for vectors that have only positive values. In one embodiment, any negative scores can be made positive by taking its absolute value.

In one embodiment, the tables associated with the top n-similar columns of the tables of data lakehouse 104 form a set of joinable tables.

In operation 703, join table search engine 202 of schema discovery mechanism 105 identifies the foreign keys in the identified joinable tables.

As discussed above, foreign keys, as used herein, link data in one table to the data in another table. A foreign key column in a table points to a column with unique values in another table (often the primary key column) to create a way of cross-referencing the two tables.

In one embodiment, join table search engine 202 identifies the foreign keys in the identified joinable tables by running a key and cross-domain analysis on the compatible column pairs of the joinable tables. In one embodiment, join table search engine 202 utilizes various software tools for identifying the foreign keys in the identified joinable tables, such as InfoSphere.

In one embodiment, join table search engine 202 identifies the foreign keys in the identified joinable tables by using the Levenshtein distances of column names to find foreign key relationships.

In operation 704, join table search engine 202 of schema discovery mechanism 105 removes the duplicate values/records in the joinable tables using table embeddings 308.

As stated above, in one embodiment, such duplicate values/records are removed by comparing table embeddings 308 amongst each other to identify duplicate table embeddings and then removing the duplicate values in the joinable tables associated with such duplicate table embeddings.

In operation 705, join table search engine 202 of schema discovery mechanism 105 ranks the joinable tables (after removing duplicate values/records) by computing the similarity between the columns of joinable tables by using the containment measure. The "containment measure," as used herein, measures the degree of containment between two sets of columns to determine which members are shared and distinct. In one embodiment, the containment measure corresponds to the distance between two column embeddings 309 using cosine similarity.

As discussed above, cosine similarity refers to a measure of similarity between two non-zero vectors defined in an inner product space. Cosine similarity is the cosine of the angle between the vectors. That is, it is the dot product of the vectors divided by the product of their lengths. The higher the similarity measure, the greater the similarity between the candidate joinable tables associated with such column embeddings 309.

As also discussed above, in one embodiment, join table search engine 202 ranks the joinable tables based on the containment measurement (e.g., cosine similarity measurement). The higher the containment measurement (e.g., cosine similarity measurement), the higher the ranked joinable table.

In operation 706, join table search engine 202 of schema discovery mechanism 105 re-ranks the joinable tables using cosine similarity between their metadata.

As stated above, in one embodiment, join table search engine 202 re-ranks the joinable tables using cosine similarity between the metadata (e.g., metadata 311) associated with the query table and each of the candidate joinable tables.

In one embodiment, such metadata (e.g., metadata 311) corresponds to the key-value pairs that were stored in database 312.

As discussed above, cosine similarity refers to a measure of similarity between two non-zero vectors defined in an inner product space. Cosine similarity is the cosine of the angle between the vectors. That is, it is the dot product of the vectors divided by the product of their lengths. The higher the similarity measure, the greater the similarity between the candidate joinable tables associated with such metadata.

In one embodiment, the cosine similarity measure is a score between the values of 0 and 1 for vectors that have only positive values.

In operation 707, join table search engine 202 of schema discovery mechanism 105 identifies a list of candidate joinable tables based on the re-ranked joinable tables as illustrated in FIG. 4, where higher ranked joinable tables are listed prior to lower ranked joinable tables.

For example, as illustrated in FIG. 4, a list of candidate joinable tables 404 is formed from the table join search 405 performed by join table search engine 202 discussed above.

Upon forming a list of candidate joinable tables, a schema for data lakehouse 104 may be discovered as discussed below in connection with FIG. 8.

FIG. 8 is a flowchart of a method 800 for discovering the schema of the data lakehouse (e.g., data lakehouse 104) in accordance with an embodiment of the present disclosure.

Referring to FIG. 8, in conjunction with FIGS. 1-7, in operation 801, schema discovery engine 203 of schema discovery mechanism 105 selects joinable tables from the list of candidate joinable tables that satisfy an inclusion dependency constraint as illustrated in FIG. 4.

As shown in FIG. 4, a portion of the joinable tables 406 from the list of candidate joinable tables 404 that satisfy an inclusion dependency constraint 407 are selected (such joinable tables 406 are referred to as the annotated tables).

In one embodiment, given two relations $R_i$, $R_j \in R$, $i \neq j$, an inclusion dependency (IND), denoted as $R_i[X] \subseteq R_j[Y]$, refers to having all the value entries in the column combination X being contained in the column combination Y.

In operation 802, schema discovery engine 203 of schema discovery mechanism 105 identifies the foreign keys having full containment with the primary key of the query table from the selected joinable tables.

As discussed above, the query table is a named table that contains a database specific query. In one embodiment, such foreign keys are identified based on the foreign keys previously identified by indexing engine 201, which are associated with the selected joinable tables. Furthermore, as discussed above, the primary key of the query table refers to the primary key discussed above in connection with indexing engine 201, which was identified using a unique column combination constraint.

In this manner, by identifying the foreign keys having full containment with the primary key of a query table from the selected joinable tables, such identified primary and foreign keys are utilized to build/discover the schema, such as a relational schema, of data lakehouse 104.

Furthermore, the principles of the present disclosure improve the technology or technical field involving a data lakehouse.

As discussed above, schema discovery is an essential factor in a data lakehouse's ability to support big data analytics. Weak discoverability makes data less accessible and undermines good governance practices. A schema is the organization or structure for a data lakehouse. An example of a schema is a relational schema, which defines the design and structure of the data structured in tables (called relations in relational schemas). The relational schema describes how those tables relate to each other. Schema discovery refers to finding and documenting the structure of data sources within a repository, such as a data lakehouse. Schema discovery involves searching and retrieving metadata about the datasets in a data lakehouse's object storage. This metadata turns into schemas that define table structures and allow the creation of table and column previews to aid exploration and query development. For example, the schema can be used to identify joinable tables helping the user to write SQL (structured query language) queries. By making schemas more discoverable, these features let companies maximize the value of their data lakehouses through expanded data accessibility, data integration, data virtualization, and data optimization. For example, by making schemas more discoverable, it is easier for engineers to discover schemas which streamlines pipeline development and helps eliminate internal barriers between data assets. Engineers can develop ingestion pipelines faster when they have reliable access to information about data sources. Likewise, discoverability tools can quickly identify schema changes that could disrupt existing pipelines. In another example, discoverability supports data optimization. The stale and inaccurate datasets become easier to find. Furthermore, engineers can integrate the schema into workflows that improve data quality, currency, and integrity. A schema, such as a relational schema, for a data lakehouse can be built or discovered by identifying the primary and foreign keys to build the relational schema. Primary keys serve as unique identifiers for each row in a database table. Foreign keys link data in one table to the data in another table. A foreign key column in a table points to a column with unique values in another table (often the primary key column) to create a way of cross-referencing the two tables. Unfortunately, due to the fact that a data lakehouse consists of a large set of data in tabular form, it is difficult to automatically identify the primary and foreign keys to build the schema, such as a relational schema.

Embodiments of the present disclosure improve such technology by identifying a primary key of a query table of a data lakehouse, which may consist of multiple columns. A column, as used herein, is a list of values, usually belonging to a particular field, displayed vertically in a table. A query table, as used herein, is a named table that contains a database specific query. In one embodiment, the primary key of the query table is identified using a unique column combination constraint. The top n-similar columns of the tables of the data lakehouse are identified to identify the joinable tables using the primary key as a query using column embeddings. In one embodiment, the primary key is the column or columns that contain values that uniquely identify each row in a table. Column embeddings of such columns are then compared amongst each other using a similarity measure to identify the top n-similar columns. In one embodiment, such a similarity measure corresponds to cosine similarity or the Euclidean distance. In one embodiment, the higher the similarity measure, the greater the similarity between the columns associated with such column embeddings. A list of candidate joinable tables is identified based on the identified top n-similar columns of tables of the data lakehouse. Joinable tables from the list of candidate joinable tables are selected that satisfy an inclusion dependency constraint. Given two relations $R_i$, $R_j \in R$, $i \neq j$, an inclusion dependency (IND), denoted as $R_i[X] \subseteq R_j[Y]$, refers to having all the value entries in the column combination X being contained in the column combination Y. The foreign keys having full containment with the primary key of a query table are then identified from the selected joinable tables. Such identified primary and foreign keys are utilized to build/discover the schema, such as a relational schema, of the data lakehouse. In this manner, the primary and foreign keys are automatically identified to build the schema, such as a relational schema, of the data lakehouse. Furthermore, in this manner, there is an improvement in the technical field involving a data lakehouse.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for identifying primary and foreign keys to build a schema, the method comprising:

identifying a primary key of a query table of a data lakehouse consisting of multiple columns, wherein each of the columns is a list of values displayed vertically, wherein the data lakehouse is a platform built from a combination of a data lake and a data warehouse, wherein the query table is a named table that contains a database specific query;

identifying top n-similar columns of tables of the data lakehouse to identify joinable tables using the primary key as a query using column embeddings, wherein the primary key is a column or columns that contain values that uniquely identify each row in a table;

identifying a first set of foreign keys in the identified joinable tables by running a key and cross-domain analysis on compatible column pairs of the joinable tables, wherein the foreign keys link data in one table to data in another table;

identifying a list of candidate joinable tables based on the identified top n-similar columns of tables of the data lakehouse;

selecting joinable tables from the list of candidate join tables that satisfy an inclusion dependency constraint; and identifying foreign keys based on the first set of foreign keys having full containment with the primary key of the query table from the selected joinable tables.

2. The method as recited in claim 1, wherein the primary key of the query table of the data lakehouse is identified using a unique column combination constraint.

3. The method as recited in claim 1 further comprising:

ranking joinable tables of the identified joinable tables by computing a similarity between columns of joinable tables of the identified joinable tables using a containment measure.

4. The method as recited in claim 3 further comprising:

re-ranking the ranked joinable tables using cosine similarity, wherein the identified list of candidate joinable tables is based on the re-ranked joinable tables.

5. The method as recited in claim 1 further comprising:

creating a hash map by hashing each value of data in the data lakehouse;

creating a column-hash sparse matrix based on the hash map; and creating a vector space model to represent objects in tables as vectors of identifiers using the column-hash sparse matrix.

6. The method as recited in claim 5, wherein the vector space model is created by applying single value decomposition using random indexing to compress the column-hash sparse matrix into two dense matrices.

7. The method as recited in claim 6 further comprising:

creating the column embeddings using the vector space model.

8. A computer program product for identifying primary and foreign keys to build a schema, the computer program product comprising one or more computer readable storage mediums having program code embodied therewith, the program code comprising programming instructions for:

identifying a primary key of a query table of a data lakehouse consisting of multiple columns, wherein each of the columns is a list of values displayed vertically, wherein the data lakehouse is a platform built from a combination of a data lake and a data warehouse, wherein the query table is a named table that contains a database specific query;

identifying top n-similar columns of tables of the data lakehouse to identify joinable tables using the primary key as a query using column embeddings, wherein the primary key is a column or columns that contain values that uniquely identify each row in a table;

identifying a first set of foreign keys in the identified joinable tables by running a key and cross-domain analysis on compatible column pairs of the joinable tables, wherein the foreign keys link data in one table to data in another table;

identifying a list of candidate joinable tables based on the identified top n-similar columns of tables of the data lakehouse;

selecting joinable tables from the list of candidate join tables that satisfy an inclusion dependency constraint; and identifying foreign keys based on the first set of foreign keys having full containment with the primary key of the query table from the selected joinable tables.

9. The computer program product as recited in claim 8, wherein the primary key of the query table of the data lakehouse is identified using a unique column combination constraint.

10. The computer program product as recited in claim 8, wherein the program code further comprises the programming instructions for:

ranking joinable tables of the identified joinable tables by computing a similarity between columns of joinable tables of the identified joinable tables using a containment measure.

11. The computer program product as recited in claim 10, wherein the program code further comprises the programming instructions for:

re-ranking the ranked joinable tables using cosine similarity, wherein the identified list of candidate joinable tables is based on the re-ranked joinable tables.

12. The computer program product as recited in claim 8, wherein the program code further comprises the programming instructions for:

creating a hash map by hashing each value of data in the data lakehouse;

creating a column-hash sparse matrix based on the hash map; and creating a vector space model to represent objects in tables as vectors of identifiers using the column-hash sparse matrix.

13. The computer program product as recited in claim 12, wherein the vector space model is created by applying single value decomposition using random indexing to compress the column-hash sparse matrix into two dense matrices.

14. The computer program product as recited in claim 13, wherein the program code further comprises the programming instructions for:

creating the column embeddings using the vector space model.

15. A system, comprising:

a memory for storing a computer program for identifying primary and foreign keys to build a schema; and a processor connected to the memory, wherein the processor is configured to execute program instructions of the computer program comprising:

identifying a primary key of a query table of a data lakehouse consisting of multiple columns, wherein each of the columns is a list of values displayed vertically, wherein the data lakehouse is a platform built from a combination of a data lake and a data warehouse, wherein the query table is a named table that contains a database specific query;

identifying top n-similar columns of tables of the data lakehouse to identify joinable tables using the primary key as a query using column embeddings, wherein the primary key is a column or columns that contain values that uniquely identify each row in a table;

identifying a first set of foreign keys in the identified joinable tables by running a key and cross-domain analysis on compatible column pairs of the joinable tables, wherein the foreign keys link data in one table to data in another table;

identifying a list of candidate joinable tables based on the identified top n-similar columns of tables of the data lakehouse;

selecting joinable tables from the list of candidate join tables that satisfy an inclusion dependency constraint; and identifying foreign keys based on the first set of foreign keys having full containment with the primary key of the query table from the selected joinable tables.

16. The system as recited in claim 15, wherein the primary key of the query table of the data lakehouse is identified using a unique column combination constraint.

17. The system as recited in claim 15, wherein the program instructions of the computer program further comprise:

ranking joinable tables of the identified joinable tables by computing a similarity between columns of joinable tables of the identified joinable tables using a containment measure.

18. The system as recited in claim 17, wherein the program instructions of the computer program further comprise:

re-ranking the ranked joinable tables using cosine similarity, wherein the identified list of candidate joinable tables is based on the re-ranked joinable tables.

19. The system as recited in claim 15, wherein the program instructions of the computer program further comprise:

creating a hash map by hashing each value of data in the data lakehouse;

creating a column-hash sparse matrix based on the hash map; and creating a vector space model to represent objects in tables as vectors of identifiers using the column-hash sparse matrix.

20. The system as recited in claim 19, wherein the vector space model is created by applying single value decomposition using random indexing to compress the column-hash sparse matrix into two dense matrices.

* * * * *